United States Patent
Berke

(10) Patent No.: US 7,530,689 B2
(45) Date of Patent: May 12, 2009

(54) ORTHOKERATOLOGICAL CONTACT LENSES AND DESIGN METHODS THEREFOR

(75) Inventor: William M. Berke, Cowan Heights, CA (US)

(73) Assignee: Natural Focus LLP, Santa Ana, CA (US)

( * ) Notice: Subject to any disclaimer, the term of this patent is extended or adjusted under 35 U.S.C. 154(b) by 218 days.

(21) Appl. No.: 11/282,294

(22) Filed: Nov. 17, 2005

(65) Prior Publication Data

US 2006/0152674 A1 Jul. 13, 2006

Related U.S. Application Data

(60) Provisional application No. 60/629,221, filed on Nov. 17, 2004.

(51) Int. Cl.
*G02C 7/04* (2006.01)
(52) U.S. Cl. .................... 351/160 R; 351/161; 351/247
(58) Field of Classification Search ............. 351/160 R, 351/161, 162, 160 H, 212, 247
See application file for complete search history.

(56) References Cited

U.S. PATENT DOCUMENTS

| 5,220,359 | A  | * | 6/1993  | Roffman .................... 351/177 |
| 5,695,509 | A  | * | 12/1997 | El Hage ..................... 606/166 |
| 6,582,077 | B1 | * | 6/2003  | Tabb et al. .................. 351/177 |
| 2002/0163620 | A1 | * | 11/2002 | Miyamura et al. .......... 351/161 |
| 2004/0070732 | A1 | * | 4/2004  | Mitsui ........................ 351/247 |

* cited by examiner

*Primary Examiner*—Huy K Mai
(74) *Attorney, Agent, or Firm*—Sheppard Mullin Richter & Hampton

(57) ABSTRACT

The present invention provides an orthokeratological contact lens to be worn on a patient's cornea and methods for prescribing the same. The contact lens comprises a parabolic lens having an inner surface configured to face an epithelium of the patient's cornea, wherein the parabolic lens is adapted to reshape the cornea by way of epithelium tissue growth. In a pre-treatment configuration, an outer surface of the epithelium does not conform to the contours of the inner surface of the parabolic lens such that there exits a gap comprising a hypertrophy volume that is disposed between the epithelium and the parabolic lens.

25 Claims, 2 Drawing Sheets

US 7,530,689 B2

ORTHOKERATOLOGICAL CONTACT LENSES AND DESIGN METHODS THEREFOR

REFERENCE TO RELATED APPLICATIONS

This application claims priority from U.S. Provisional Patent Application No. 60/629,221, filed on Nov. 17, 2004, the contents of which are incorporated herein by reference.

FIELD OF THE INVENTION

The present invention is directed generally to contact lenses and more particularly to rigid orthokeratological contact lenses and methods for prescribing the same.

BACKGROUND OF THE INVENTION

Millions of people experience difficulties with their vision due to a number of common refractive conditions such as myopia (nearsightedness) and hyperopia, (farsightedness). Myopia is a visual abnormality where an eye cannot focus on far-away objects because the cornea is curved too steeply and/or the eye is elongated axially front to back, such that it fails to provide a sharp focus of light at the retinal plane of the eye. On the other hand a hyperopic eye cannot focus on either far or near objects because the curvature of the cornea of the eye is too flat and/or too short axially front to back to provide adequate focusing at the retinal plane of the eye.

Another common refractive vision problem is astigmatism, which may exist alone or in combination with either myopia or hyperopia. With astigmatism, unequal curvatures of one or more refractive surfaces of the eye prevent light rays from focusing sharply at the plane on the retina, thereby resulting in blurred vision. Yet another common vision problem is presbyopia, which may occur with other refractive problems such as hyperopia, myopia, and/or astigmatism. Presbyopia is the most common vision problem in adults 40 years of age and older. At this age, many people begin to experience difficulty focusing on close objects, most commonly due to the loss of flexibility of the eye's focusing apparatus.

There exist numerous known methods for treating myopia. One conventional method of correcting the visual blur caused by myopia involves wearing a pair of concave (minus powered) spectacle lenses. In some cases, the visual blur caused by myopia may be corrected with concave (minus powered) contact lenses. In the 1970's and 1980's attempts were made to permanently correct myopia through surgical procedures such as radial keratometry (RK). More recently, approaches to correcting myopia through laser surgical reshaping of the cornea (e.g., PRK, LASIK, LASEK) have become popular.

Orthokeratology is a further approach for treating myopia, wherein the corneal shape is altered by wearing rigid contact lenses designed to continually exert pressure on selected locations of the cornea to gradually mold the cornea into the desired corneal curvature. Referring to FIG. 1, a cornea 2 is depicted including an epithelium 3 comprising a thin layer of cells that cover the surface of the cornea. Epithelium includes an outer surface 4 and an inner surface 8. In FIG. 1, the cornea 2 is shown in juxtaposition with a known contact lens 6, wherein a centerline 9 of the cornea 2 is indicated for purposes of orientation. During conventional orthokeratology treatment, the outer surface 4 of epithelium 3 is compressed against the inner surface of a relatively flat contact lens 6 such that it is thinned, thus creating a refractive adjustment or correction in the cornea.

After the refractive adjustment, a retainer lens is worn on a part-time basis to prevent the cornea from returning to its previous shape. This "maintenance period" lasts for a predetermined amount of time after removal of the corrective rigid contact lens. The successfulness of orthokeratology treatment depends on various factors including the shape and structure of the contact lens. For example, a conventional contact having a central radius of curvature that is larger than the central radius of the cornea (i.e., a "flat" contact lens) is widely believed to change the shape of the cornea by compressing the corneal surface at its apex. The reshaped cornea has a lengthened radius of curvature in its central zone, thereby reducing or eliminating the myopia.

Orthokeratology has been performed with varying degrees of success since the early 1970's. Three factors that impact the effectiveness and desirability of orthokeratology procedures and lenses include: (1) the time needed to achieve the desired visual correction; (2) the amount of myopia that can be corrected using orthokeratology; and (3) the maintenance period before the correction degrades. Regarding the time needed to achieve the desired visual correction, conventional orthokeratology techniques typically require as long as several months to accomplish a relatively small amount of myopia reduction. In addition, conventional orthokeratology techniques and lenses provide an inadequate maintenance period duration. In particular, a patient must frequently wear a retainer lens in order to increase the time between corrective sessions with the orthokeratology lens.

In view of the above, there need exists for a precisely designed contact lens, based on sound physiological and anatomical considerations, that can be used for effective and highly predictable orthokeratology of myopia.

There also exists a need for a contact lens that can be used for effective and highly predictable orthokeratology of myopia over a shorter treatment period.

In addition, there exists a need for a contact lens that can be used for effective and highly predictable orthokeratology of myopia substantial holding power such that the correction lasts for several days before a retainer lens is required.

There further exists a need for methods of prescribing contact lenses, based on sound physiological and anatomical considerations, which can be used for effective and highly predictable orthokeratology of myopia.

There also exists a need for methods of prescribing contact lenses that can be used for effective and highly predictable orthokeratology of myopia over a shorter treatment period.

There additionally exists a need for methods of prescribing contact lenses that can be used for effective and highly predictable orthokeratology of myopia substantial holding power such that the correction lasts for several days before a retainer lens is required.

SUMMARY OF THE INVENTION

In view of the foregoing, it is an object of the present invention to provide a precisely designed contact lens, based on sound physiological and anatomical considerations, that can be used for effective and highly predictable orthokeratology of myopia.

It is another object of the invention to provide a contact lens that can be used for effective and highly predictable orthokeratology of myopia over a shorter treatment period.

It is a further object of the invention top provide a contact lens that can be used for effective and highly predictable orthokeratology of myopia substantial holding power such that the correction lasts for several days before a retainer lens is required.

It is an additional object of the invention to provide methods of prescribing contact lenses, based on sound physiological and anatomical considerations, which can be used for effective and highly predictable orthokeratology of myopia.

It is another object of the invention to provide methods of prescribing contact lenses that can be used for effective and highly predictable orthokeratology of myopia over a shorter treatment period.

It is a further object of the invention to provide methods of prescribing contact lenses that can be used for effective and highly predictable orthokeratology of myopia substantial holding power such that the correction lasts for several days before a retainer lens is required.

One aspect of the invention involves an orthokeratological contact lens to be worn on a patient's cornea, comprising a parabolic lens having an inner surface configured to face an epithelium of the patient's cornea, wherein the parabolic lens is adapted to reshape the cornea by way of epithelium tissue growth. In a pre-treatment configuration, an outer surface of the epithelium does not conform to the contours of the inner surface of the parabolic lens such that there exits a gap comprising a hypertrophy volume that is disposed between the epithelium and the parabolic lens.

After the patient has worn the parabolic lens for a sufficient amount of time, the hypertrophy volume is filled by the epithelium, thereby achieving the desired refractive adjustment of the cornea. The parabolic lens includes a plurality of zones including a treatment zone, an inverse zone, an alignment zone and a peripheral zone, wherein each zone includes a predetermined width and curvature. In operation, the parabolic lens is configured to rest on the cornea rather than putting significant pressure on the eye tissue such that there is no significant compression of the epithelium or migration of cells.

Another aspect of the invention involves a method of determining a prescription for an orthokeratological contact lens for reshaping a patient's cornea by epithelium tissue growth, comprising the steps of determining the refractive error prescription of the cornea using traditional eye examination and refraction techniques, determining the overall corneal diameter, determining the topography of the cornea, calculating the epithelium volume of the cornea and making an appropriate volume adjustment based upon the epithelium volume of the cornea. The method may further comprise the steps of determining the curvature and width of the inverse zone, alignment zone and peripheral zone, and determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

Further objects and advantages of the invention will be brought out in the following portions of the specification, wherein the detailed description is for the purpose of fully disclosing preferred embodiments of the invention without placing limitations thereon.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention is directed to contact lenses, methods of producing the contact lenses and methods of treatment of myopia using the contact lenses. Particularly, each contact lens preferably is designed based on physiological and anatomical considerations of a patient's eye to obtain a rapid and predictable orthokeratological change in the refractive power of the eye for the purpose of correcting myopia.

Figure 2:
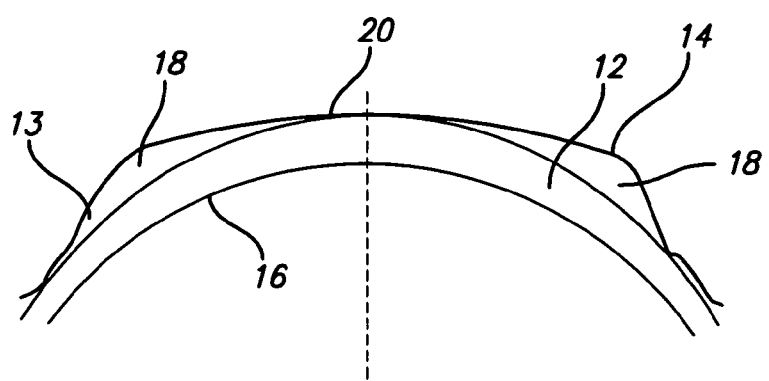
FIG. 2 is a cross sectional view of an orthokeratological contact lens for reshaping a patient's cornea by epithelium tissue growth, in accordance with the principles of the present invention.

Referring to FIG. 2, a cornea 10 having centerline 20 is depicted for treatment with a parabolic contact lens 14 having an inner surface facing epithelium 12. Epithelium 12 includes an outer surface 13 and an inner surface 16. In accordance with the principles of the present invention, in a pre-treatment configuration, outer surface 13 of epithelium 12 does not conform to the contours of the inner surface of contact lens 14 such that there exits a gap 18 or hypertrophy volume 18 between the epithelium 12 and the contact lens 14. The hypertrophy volume 18 is created due to the relative flatness of the contact lens 14 relative to cornea 10. The contact lens 14 helps reshape the cornea 10 when worn by a patient because over time the epithelium 12 conforms the contours of the inner surface of contact lens 14. Inner surface 16 of epithelium 12 is used to calculate the hypertrophy volume 18 of the epithelium 12. After the contact lens 14 has been worn by the patient for a sufficient amount of time, the hypertrophy volume 18 is filled by the enlarged epithelium 12, thereby achieving the desired refractive adjustment of the eye.

Figure 3:
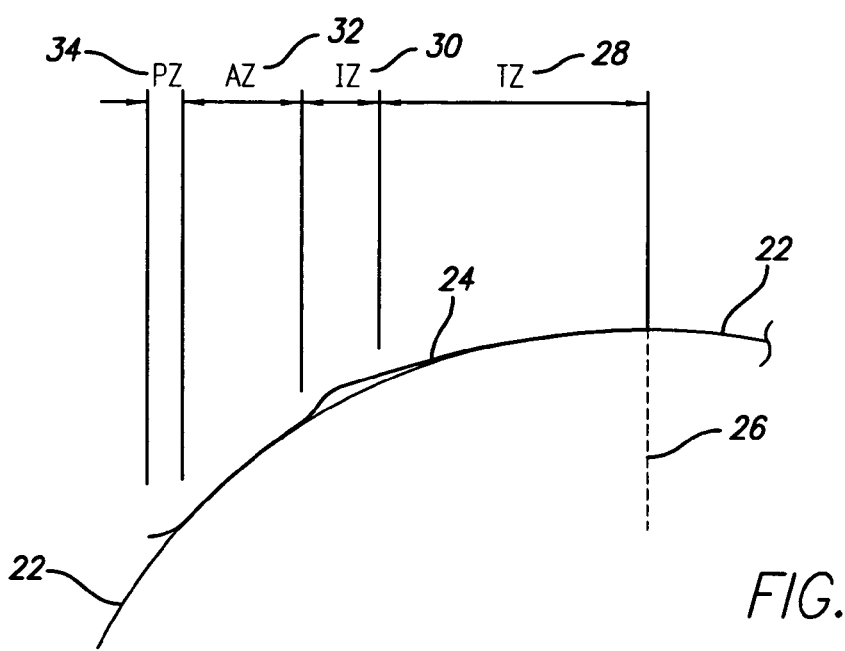
FIG. 3 is a cross sectional view of an orthokeratological contact lens of the present invention disposed on a corneal surface.

Referring to FIG. 3, a cornea 22 is reshaped by the inside surface of contact lens 24, which includes four curved zones comprising treatment zone 28 ("TZ"), inverse zone 30 ("IZ"), alignment zone 32 ("AZ") and peripheral zone 34 ("PZ"), wherein the centerline 26 of the cornea 22 is indicated for orientation. The treatment zone 28, inverse zone 30, alignment zone 32 and peripheral zone 34 preferably each include a predetermined width and curvature. According to the preferred embodiment of the invention, each curved zone is parabolic to maximize the effect on the cornea. In addition, the width of treatment zone 28 is preferably optimized to obtain the desired eye corrective result, and the inverse zone 30 and the alignment zone 32 are preferably designed to meet the particular characteristics of the cornea.

Figure 1:
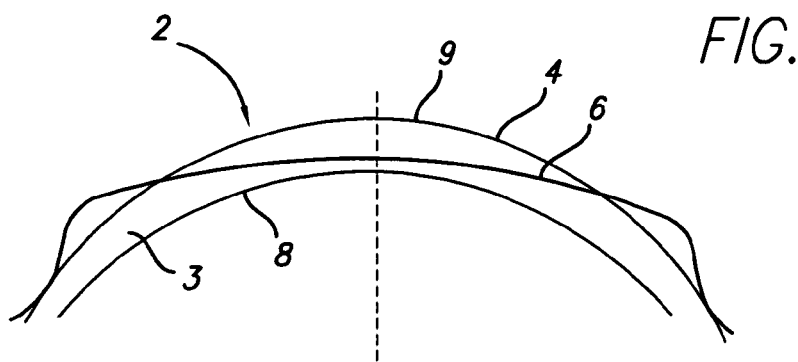
FIG. 1 is a cross sectional view of a cornea illustrating a known approach to an orthokeratological reshaping of the cornea by central corneal thinning.

According to an aspect of the invention, the orthokeratology contact lens 24 rests on the cornea 22 of a patient's rather than putting significant pressure on the eye tissue, as is the case with many conventional contact lenses, including the contact lens 6 depicted in FIG. 1. From a physiologically standpoint, there is no compression of the epithelium or migration of cells due to the contact lenses of the present invention. Instead, the contact lenses of the invention are designed to cause epithelial cell hypertrophy into the epithelium hypertrophy volume 18 (see FIG. 2). As epithelial tissue hypertrophies into the epithelium hypertrophy volume 18, a new lens shape forms that corrects the myopic condition of the eye.

An orthokeratology contact lens preferably is employed to optimize the diameter of treatment zone 28. Specifically, the contact lens is used to determine the largest wearable overall contact lens diameter that will bring about the greatest refractive change in the patient's eye. Then, the orthokeratology contact lens is used to determine appropriate widths for the inverse zone 30 and the alignment zone 32. The resulting lens design is therefore determined by a patient's individual corneal shape. Advantageously, such a lens design enables a great amount of change in eye shape in a short time and results in a longer maintenance period for the corrected eye.

Testing has shown that using the largest reasonable overall diameter for the contact lens is advantageous to the orthokeratology outcome. The maximum overall diameter is limited by increasing discomfort when it exceeds particular limits. However, a smaller lens will require more time to cause the desired orthokeratological adjustment. In a preferred embodiment, the overall diameter of the contact lens is chosen such that the lens is both comfortable to the patient and results in effective orthokeratological treatment over a reasonable amount of time. According to some embodiments, the maximum overall diameter of a lens may be determined by measuring the minimum diameter of the cornea and subtracting approximately 0.2 mm.

With further reference to FIG. 2, it has been observed that orthokeratological adjustment of the cornea occurs by growth of the epithelial layer by cellular hypertrophy into the epithelium hypertrophy volume 18. By contrast, conventional lenses achieve the desired changes by thinning or compression of the central portion of the cornea. As explained hereinabove, the epithelium hypertrophy volume 18 comprises the gap between inner contact lens surface and the pre-treatment position of the outer surface 13 of epithelium 12. The epithelium 12 comprises the outermost layer of the five layers that make up the anatomy of the cornea 10 and is the layer largely affected by orthokeratology. The total volume of epithelium 12 in the patient's cornea 10 determines the maximum orthokeratological adjustment that may be achieved.

With further reference to FIG. 3, the rigid gas permeable orthokeratology contact lens 24 of the present invention has four distinct zones including treatment zone 28, inverse zone 30, alignment zone 32 and peripheral zone 34. Treatment zone 28, which may be referred to herein as the "optic zone", comprises the centermost zone of the lens 24. This zone includes a substantially parabolic shape, which is flatter by a predetermined amount than the flattest meridian of the cornea 22. The amount of flatness of treatment zone 28 is precisely determined since this zone forms the epithelium hypertrophy volume 18 (see FIG. 2) into which the corneal epithelial tissue hypertrophies, thereby correcting the refractive error of the patient's eye.

Inverse zone 30 preferably comprises a parabolic curve that is steeper than the adjacent treatment zone 28, instead of being flatter than the treatment zone 28, as in conventional orthokeratology contact lenses. The precise curvature and width of inverse zone 30 are determined according to the specific anatomical parameters of the patient's cornea 22, so that the inverse zone 30 returns the lens 24 to the eye precisely without over or under shooting the target cornea 22.

Alignment zone 32 begins at the point where inverse zone 30 returns the lens to the eye. The parabolic curvature of alignment zone 32 preferably matches the parabolic curvature of the cornea as closely as reasonably possible, thus providing a substantially closed cavity and creating the pressure forces that initiate epithelial hypertrophy into the epithelium hypertrophy volume 18. The pressure forces lead to the ultimate reshaping of the cornea 22 necessary to correct the visual problem. The width of alignment zone 32 is determined by calculating the attractive force required to stabilize the lens on the eye, and then adjusting this width by the epithelial volume factor. Peripheral zone 34 is also parabolic in shape, yet is slightly flatter than the underlying cornea 22 to provide for peripheral tear exchange.

It has been observed that the epithelial tissue volume within the cornea determines the maximum prescriptive error adjustment that can be achieved for an eye. The epithelial tissue volume is calculated by multiplying the average epithelial thickness for the cornea by the area of the cornea over a chord length that is approximately 6.5 mm in diameter. The average epithelial thickness is determined through a series of measurements, for example using an ultrasonic pachometer. An eye having a greater epithelial thickness, and therefore a greater epithelial tissue volume, is capable of receiving a greater orthokeratological correction than an eye having a thinner epithelial thickness.

If the epithelial tissue volume is too small to enable full correction of the patient's myopic condition, the treatment zone 28 is reduced in size through a corresponding increase in the width of alignment zone 32. Thus, by measuring the epithelial tissue volume and determining and adjusting the lens parameters to control the ratio of alignment zone width to treatment zone width, a precise prescription change can be rapidly and accurately achieved. The width of alignment zone 32 is determined by applying an epithelial volume factor adjustment.

The parabolic shape of the contact lenses of the present invention comprises a distinct advantage over conventional rigid gas permeable lenses because the cornea is also parabolic in shape, thus enabling rapid and long lasting corneal changes. The methods described herein lead to a one lens per patient eye design that achieves rapid and precisely controlled results, as opposed to the well known practice of using and changing lenses several times to achieve a desired result.

Figure 4:
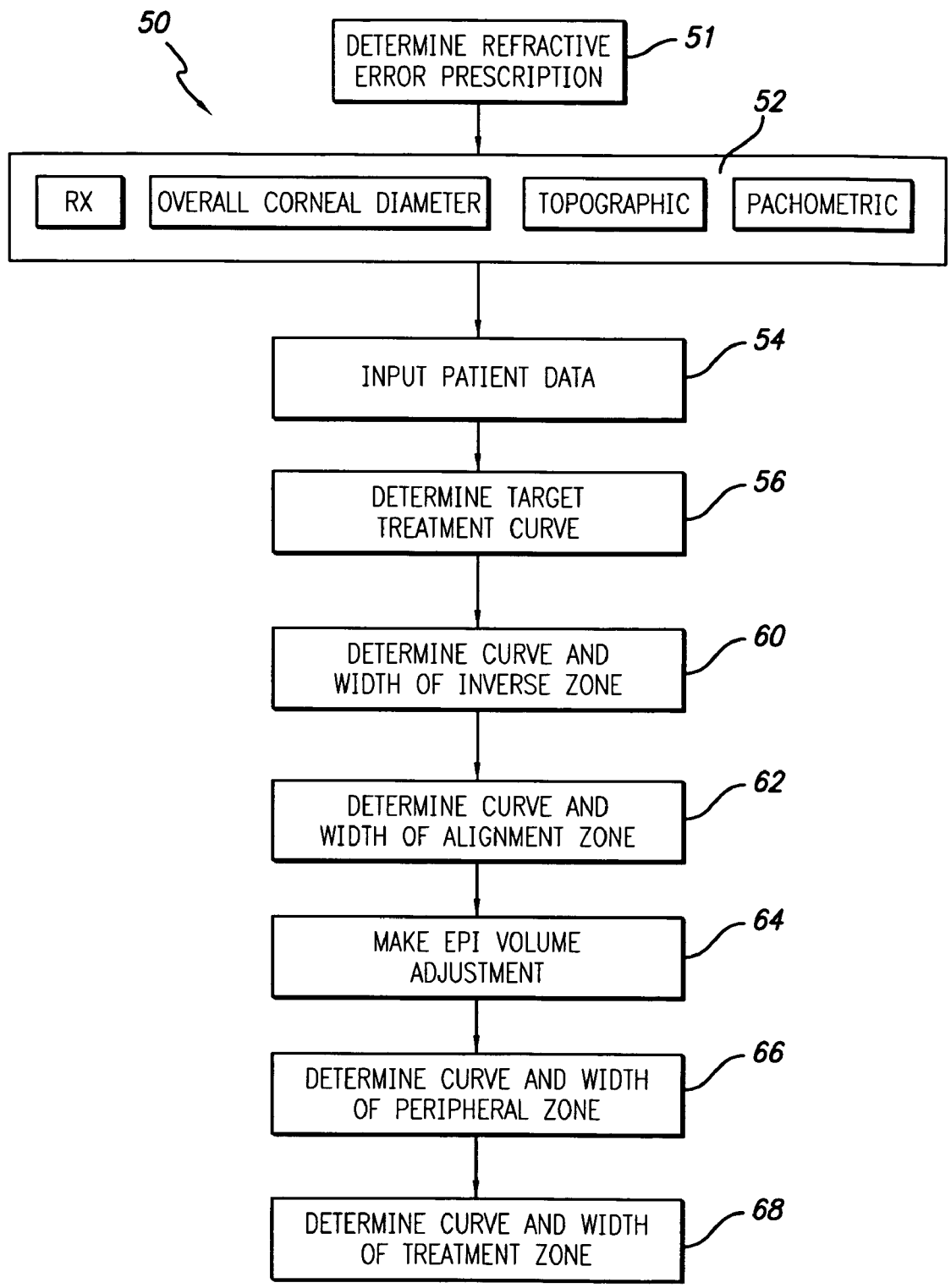
FIG. 4 depicts a method of producing an orthokeratological contact lens for reshaping a patient's cornea by epithelium tissue growth, in accordance with the principles of the present invention.

Referring to FIG. 4, a preferred method 50 for determining an appropriate prescription for the contact lenses of the present invention will now be described. In step 51, the refractive error prescription is determined using traditional eye examination and refraction techniques that are per se known in the art. Step 52 involves determining the overall corneal diameter by measuring a shortest visible iris diameter and subtracting 0.2 mm from the measured diameter. Measuring the diameter can be achieved using an ultrasonic pachometer or other suitable device. This step should yield a contact lens that is substantially the largest comfortable lens for the patient's eye. Step 54 involves inputting patient eye data, while step 56 involves determining the topography of the cornea. The step of determining the topography of the cornea involves determining the curvature and elevation at critical points on the cornea.

In step 60, the curvature and width of the inverse zone is determined according to the specific anatomical parameters of the patient's cornea, so that the inverse zone returns the contact lens to the eye precisely without over or under shooting the target cornea. The inverse zone is initially assigned a width of 0.6 mm, and is increased by the distance the parabolic curve has to go. The slope of the parabolic curve is maintained low for wearer comfort, and higher prescriptions require a wider inverse zone to facilitate returning the lens to the cornea. Therefore, the width of inverse zone is increased 0.01 mm for every 0.50 diopter of relative lens flatness. For example, a 2-diopter flat target lens has an inverse zone width of about 0.64 mm, while a 4-diopter flat lens has an inverse zone width of about 0.68 mm. Knowing the width of the inverse zone, the inverse zone parabolic curve is then calculated such that its curve (beginning at the edge of the treatment zone) causes the distal edge of the inverse zone to just reach the corneal surface at which point the alignment zone begins.

Step 62 involves determining the curvature and width of the alignment zone, wherein the width of the alignment zone is determined by calculating the attractive force required to stabilize the lens on the eye, and then adjusting this width by the epithelial volume factor. This width is initially assigned as 1.0 mm, and increases by 0.1 mm per diopter of relative lens. The width is then adjusted by multiplying it by the epithelial tissue volume factor to determine the final width of alignment zone. The curve of alignment zone comprises a parabola based on the topography measurements such that the alignment zone is substantially parallel with the contour of the corneal surface on which it rests.

Step 64 involves determining the epithelial volume factor and making an appropriate volume adjustment. The epithelium volume of the cornea may be determined by conducting pachometry on the cornea using a center point, a point 3 mm below the center point, a point 3 mm above the center point, a point 3 mm lateral to the center point, and a point 3 mm medial to the center point. The average epithelial thickness is then calculated from these five pachometry measurements. The thickness of the epithelia is measured and the total epithelial volume over a 6.5 mm cord is calculated. The epithelial tissue volume factor is defined to be equal to 1.00 if the maximum refractive change potential is greater than or equal to the desired change. This results in no adjustment to the diameter of alignment zone, as none is necessary to achieve the desired result. However, if the maximum refractive change potential is less than the desired change, then the epithelial tissue volume factor is determined from experimentally derived data that compares epithelial tissue volume values to refractive change potential. Such data may be in the form of a nomogram, which relates epithelial tissue volume factor to the difference between the maximum refractive change potential and the desired change.

With further reference to FIG. 4, step 66 involves determining the width and curvature of the peripheral zone, which comprises the outermost zone of the lens that is approximately 0.4 mm wide with a steep parabolic lift that flattens to an equivalent radius of curvature of about 11.25 mm. In step 68, the width and curvature of treatment zone are determined. Beginning with the overall corneal diameter as determined in step 52, the inverse zone, alignment zone and peripheral zone widths calculated in steps 60, 62 and 66, the largest allowable treatment zone is determined using the following equation: TZ=OD−2*PZ−2*AZ−2*IZ, where TZ is the width of the treatment zone in mm, OD is the overall diameter of the contact lens in mm, PZ is the width of the peripheral zone in mm, AZ is the width of the alignment zone in mm, and IZ is the width of the inverse zone in mm. The diameter of treatment zone is determined by comparing the corneal topography to the target prescription change. Advantageously, a contact lens produced by this method causes epithelial reshaping as required for a particular eye, and also yields an improved maintenance period.

According to some embodiments of the invention, lens thickness is set to approximately 0.23 mm at the center of the lens. This prevents lens flexure and ensures mold rigidity. Edge thickness is calculated and adjusted for patient comfort by trial and error. The contact lenses described herein preferably comprise known high or hyper DK gas permeable materials that are approved by the Federal Drug Administration for use in overnight wear. As would be appreciated by those of ordinary skill in the art, many other types of lenses may be employed without departing from the scope of the present invention.

Thus, it is seen that rigid orthokeratological contact lenses and methods for prescribing the same are provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. An orthokeratological contact lens to be worn on a patient's cornea, comprising:
   a parabolic lens having an inner surface configured to face an epithelium of the patient's cornea;
   wherein the parabolic lens is designed to reshape the cornea by way of epithelium tissue growth;
   wherein the parabolic lens is designed to reshape the cornea without excessive pressure on the eye tissue such that there is no compression or migration of the epithelium cells.

2. The contact lens of claim 1, wherein, in a pre-treatment configuration, an outer surface of the epithelium does not conform to the contours of the inner surface of the parabolic lens such that there exits a gap between the epithelium and the parabolic lens.

3. The contact lens of claim 2, wherein the gap comprises a hypertrophy volume.

4. The contact lens of claim 3, wherein after the patient has worn the parabolic lens for a sufficient amount of time, the hypertrophy volume is filled by the epithelium, thereby achieving the desired refractive adjustment of the cornea.

5. The contact lens of claim 1, wherein the parabolic lens helps reshape the cornea when worn by the patient because the epithelium conforms the contours of the inner surface of the parabolic lens over time.

6. The contact lens of claim 1, wherein the parabolic lens includes a plurality of zones.

7. The contact lens of claim 6, wherein the plurality of zones comprises 4 separate zones.

8. The contact lens of claim 6, wherein the plurality of zones comprises a treatment zone, an inverse zone, an alignment zone and a peripheral zone.

9. The contact lens of claim 6, wherein each zone includes a predetermined width and curvature.

10. The contact lens of claim 1, wherein the parabolic lens is designed to promote epithelial cell hypertrophy into an epithelium hypertrophy volume, thereby creating a new lens shape forms that corrects a myopic condition.

11. A contact lens to be worn on an epithelium of a patient's cornea, comprising:
    a parabolic lens having a treatment zone, an inverse zone, an alignment zone and a peripheral zone;
    wherein the parabolic lens is designed to reshape the cornea by way of epithelium tissue growth;

wherein the parabolic lens is designed to reshape the cornea without excessive pressure on the eye tissue such that there is no compression or migration of the epithelium cells.

12. The contact lens of claim 11, wherein the treatment zone comprises the centermost zone of the lens and includes a substantially parabolic shape, which is flatter by a predetermined amount than a flattest meridian of the cornea.

13. The contact lens of claim 11, wherein the inverse zone comprises a parabolic curve that is steeper than the adjacent treatment zone.

14. The contact lens of claim 11, wherein the alignment zone comprises a parabolic curve matches a parabolic curvature of the cornea, thereby providing a substantially closed cavity and creating pressure forces that initiate epithelial hypertrophy 15. The contact lens of claim 11, wherein the peripheral zone comprises a parabolic curve that is slightly flatter than the underlying cornea to provide for peripheral tear exchange.

16. A method of determining a prescription for an orthokeratological contact lens for reshaping a patient's cornea by epithelium tissue growth, comprising the steps of: determining the refractive error prescription of the cornea using traditional eye examination and refraction techniques; determining the overall corneal diameter; determining the topography of the cornea; calculating the epithelium volume of the cornea; and making an appropriate volume adjustment based upon the epithelium volume of the cornea.

17. The method of claim 16, wherein the contact lens comprises a parabolic lens having a plurality of zones including a treatment zone, an inverse zone, an alignment zone and a peripheral zone.

18. The method of claim 17, further comprising the step of determining the curvature and width of the inverse zone, alignment zone and peripheral zone.

19. The method of claim 18, further comprising the step of determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and IZ is the width of the inverse zone.

20. An orthokeratological contact lens to be worn on a patient's cornea, comprising: a parabolic lens having an inner surface configured to face an epithelium of the patient's cornea; wherein the parabolic lens is designed to reshape the cornea by way of epithelium tissue growth; and wherein the parabolic lens comprises 4 separate zones.

21. The contact lens of claim 20, wherein the 4 separate zones comprise a treatment zone, an inverse zone, an alignment zone and a peripheral zone.

22. A method of determining a prescription for a parabolic orthokeratological contact lens having a plurality of zones including a treatment zone, an inverse zone, an alignment zone and a peripheral zone, and for reshaping a patient's cornea by epithelium tissue growth, comprising the steps of: determining the refractive error prescription of the cornea using traditional eye examination and refraction techniques; determining the overall corneal diameter; determining the topography of the cornea; calculating the epithelium volume of the cornea; and making an appropriate volume adjustment based upon the epithelium volume of the cornea.

23. The method of claim 22, further comprising the step of determining the curvature and width of the inverse zone, alignment zone and peripheral zone.

24. The method of claim 23, further comprising the step of determining a largest allowable treatment zone using the equation: $TZ=OD-2*PZ-2*AZ-2*IZ$, where TZ is the width of the treatment zone, OD is the overall diameter of the contact lens, PZ is the width of the peripheral zone, AZ is the width of the alignment zone, and 1Z is the width of the inverse zone.

25. A means for orthokeratological correction, comprising:
a means for reshaping a cornea by way of epithelium tissue growth; and
a means for avoiding placing excessive pressure on the eye tissue to avoid compression or migration of the epithelium cells.

* * * * *

UNITED STATES PATENT AND TRADEMARK OFFICE
CERTIFICATE OF CORRECTION

PATENT NO. : 7,530,689 B2 Page 1 of 1
APPLICATION NO. : 11/282294
DATED : May 12, 2009
INVENTOR(S) : William Berke It is certified that error appears in the above-identified patent and that said Letters Patent is hereby corrected as shown below:

Title Pg, Item (73) Assignee: should read as follows: --Natural Focus LLP--.

Signed and Sealed this

Thirtieth Day of June, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,530,689 B2 | |
| APPLICATION NO. | : 11/282294 | |
| DATED | : May 12, 2009 | |
| INVENTOR(S) | : William Berke | |

It is certified that error appears in the above-identified patent and that said Letters Patent is hereby corrected as shown below:

Title Pg, Item (73) Assignee: should read as follows: --Natural Focus LLC--.

This certificate supersedes the Certificate of Correction issued June 30, 2009.

Signed and Sealed this

Sixth Day of October, 2009

David J. Kappos
*Director of the United States Patent and Trademark Office*